United States Patent
Roy et al.

(10) Patent No.: US 7,711,996 B2
(45) Date of Patent: May 4, 2010

(54) TEST SYSTEM AND METHOD

(75) Inventors: Andrew Roy, Erie, CO (US); Amit Bakshi, Sunnyvale, CA (US); Shlomi Krepner, Sunnyvale, CA (US); Eugene Fouxman, Mountain View, CA (US)

(73) Assignee: LeCroy Corporation, Chestnut Ridge, NY (US)

( * ) Notice: Subject to any disclaimer, the term of this patent is extended or adjusted under 35 U.S.C. 154(b) by 413 days.

(21) Appl. No.: 11/729,604

(22) Filed: Mar. 29, 2007

(65) Prior Publication Data

US 2008/0022169 A1 Jan. 24, 2008

Related U.S. Application Data

(60) Provisional application No. 60/789,488, filed on Apr. 5, 2006.

(51) Int. Cl.
*G06F 11/00* (2006.01)
*G06F 7/02* (2006.01)
*G01R 31/28* (2006.01)
*H03M 13/00* (2006.01)

(52) U.S. Cl. ............................ 714/55; 714/49; 714/51; 714/712; 714/815; 714/821

(58) Field of Classification Search ....................... None
See application file for complete search history.

(56) References Cited

U.S. PATENT DOCUMENTS

| 6,038,674 | A  | * | 3/2000  | Sasaki et al. ................. 713/500 |
| 6,173,339 | B1 | * | 1/2001  | Yorimitsu ....................... 710/5 |
| 6,748,559 | B1 | * | 6/2004  | Pfister et al. ................... 714/56 |
| 7,308,617 | B2 | * | 12/2007 | Artobello et al. .............. 714/55 |
| 7,543,195 | B2 | * | 6/2009  | Nguyen et al. ................ 714/51 |
| 2006/0029016 | A1 | * | 2/2006 | Peles ........................... 370/328 |
| 2006/0069775 | A1 | * | 3/2006 | Artobello et al. ............ 709/225 |
| 2008/0216098 | A1 | * | 9/2008 | Agarwal et al. ............. 719/328 |

* cited by examiner

*Primary Examiner*—Kevin L Ellis
*Assistant Examiner*—Guerrier Merant
(74) *Attorney, Agent, or Firm*—Gordon Kessler

(57) ABSTRACT

A method and apparatus for testing a data transfer system. The method comprises the steps of storing a first table, the first table noting at least a time of issuance of at least one command and a time of completion of the command and comparing the time of issuance of the command and the time of completion of the command. A timeout condition is registered if the processor determines that a time longer than a predetermined time elapsed between the time of issuance of the command and the time of completion of the command.

17 Claims, 3 Drawing Sheets

TEST SYSTEM AND METHOD

CROSS REFERENCE TO RELATED APPLICATIONS

This application claims the benefit under 35 USC 119 of U.S. Provisional Patent Application 60/789,488 filed Apr. 5, 2006, titled "Test System and Method" the contents thereof being incorporated herein by reference.

BACKGROUND OF THE INVENTION

Developers of large disk arrays may typically perform large and difficult debug processes when bringing a product on line and to completion. After all the components of such an array have been assembled and it has been confirmed that the array can successfully run one command at a time, the developers begin to confirm that the array will properly operate in a more real-world type of environment. Testing in such an environment includes a much more rigorous procedure, including multiple computers issuing multiple simultaneous or closely bunched commands to multiple disk drives in the array. Ultimately, in such a test environment, and also when the system is in use in the real world, there may be hundreds, or even thousands of commands pending for processing at any one time.

During such a test, as well as when in use in a real-world computing environment, often things start off running smoothly and the array is able to handle the large number of issued commands. As the test runs for a time, performance may slow down, resulting in the multiple computers beginning to complain that disk access is taking too long. In extreme cases, the entire array may "lock up", and no computer can do anything with any disk in the array, no matter how long the computer waits for a response.

These types of problems have traditionally been very hard to diagnose and fix, because the actual processing that is causing the problem takes place long before any symptoms are noticed. By the time any of the symptoms described above are noticed, the conditions that caused the problem have likely long passed through the system and have been processed.

Sometimes, such symptoms are caused by a particular command to a particular disk drive taking far longer than it should to complete. In extreme cases, the command may simply hang, and is never completed. Determining the precise one command in a sea of hundreds or thousands of other commands pending at the same time that caused such a problem has always been a difficult task.

It would therefore be beneficial to have some way to detect problems quickly in such a situation, and to provide a picture of what type of processing was being implemented at the time of the problem.

SUMMARY OF THE INVENTION

In accordance with the invention, a method and apparatus for testing just such a disk array or the like is provided. The test system constructed in accordance with the invention is wired into a system under test in a manner similar to the well known connection method for a Protocol Analyzer. Once installed, rather than attempting to record everything that is happening on the various data lines of the array under test, the test system instead monitors the various data lines looking for commands being issued, commands being completed, or any conditions that may cause commands to be cancelled. The test system maintains in substantially real time a large table of currently pending commands. The entries in the table are updated "on-the-fly" as information appears on the various data lines. The table contains a timestamp of when each command was issued. Whenever a command is completed or is cancelled, the timestamp indicating when the command was issued can be compared against the current time to see if the command took longer than a user-specified limit to complete. Additionally, in accordance with the invention, the entire table is swept periodically (performing a similar timestamp comparison) to find "hung" commands that will either not complete at all, or that might finish eventually but have already gone over the user-specified limit. Finally, an archive of all commands issued (completed or not) is kept, so that if a problem is identified, a picture of the conditions of the array and the various data lines at the time of issuance of the command associated with the problem can be reconstructed.

The types of problems that are tracked and discovered in accordance with the invention can arise when employing any type of disk attachment technology. Some of the more common types of attachment technology at the timing of filing this application include SAS (Serial-Attached SCSI), FC (Fibre Channel), SATA (Serial ATA), and Parallel SCSI. While the present invention would be applicable to any of these technologies, it should not be considered so limited. Indeed, the principles of the invention are applicable to any disk attachment technology, either currently available, or to be developed in the future. Additionally, the principles of the invention should also be considered applicable to any connectivity technology that supports simultaneous outstanding pending commands of any kind. The state machine described in accordance with the present invention may be used for data streaming, Ethernet transfers or any higher level protocols that use an underlying transport protocol to affect data transfer.

Still other objects and advantages of the invention will in part be obvious and will in part be apparent from the specification and the drawings.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DESCRIPTION OF THE PREFERRED EMBODIMENTS

Referring next to the following text and drawings various embodiments of the invention will be described.

Figure 1:
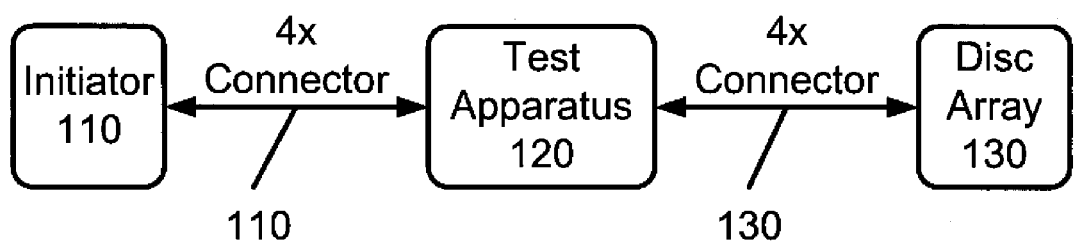
FIG. 1 depicts the connection of a test apparatus in accordance with a preferred embodiment of the invention.

Referring first to FIG. 1, a physical connection of an apparatus constructed in accordance with the invention is depicted. During normal operation, one or more initiators are connected via one or more connectors to a disk array, thereby allowing for data requests from the initiators to be routed to and addressed by the disk array. In accordance with the invention one or more initiators 100 are connected via one or more connectors 110 to a test apparatus 120. This test apparatus in turn connected via one or more connectors 130 to a disk array 140. Disk array may be made up of any number of individual disk drives, may comprise any number of other disk arrays, or may comprise a combination of the two. The disk array is also referenced in this document as the "Targets" for the commands coming from the Initiators. 4× connectors are shown for connectors 110 and 130, but any suitable connection scheme, wired or wireless as may be appropriate, may be employed to connect test apparatus 120 into the system. Test apparatus is therefore positioned between requesting initiators and providing disk arrays in a manner to monitor the traffic, but not interfere with it.

Figure 3:
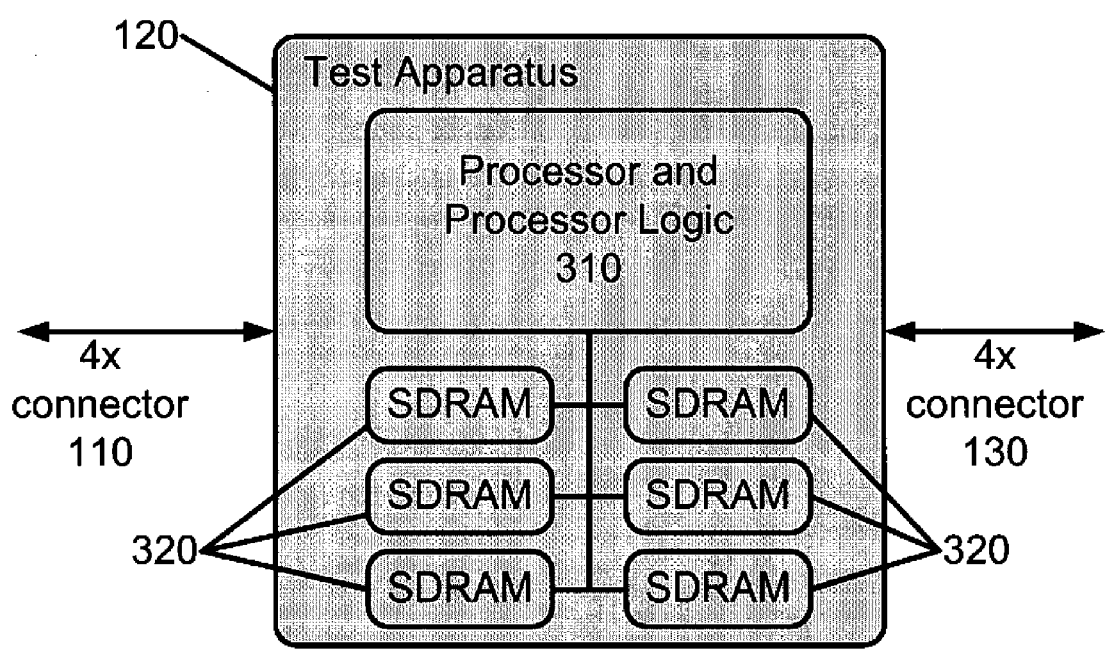
FIG. 3 is a more detailed view of the test apparatus of FIG. 1.

Referring next to FIG. 3, a more detailed view of relevant portions of test apparatus 120 is shown. Test apparatus further comprises a processor 310 for processing various commands associated therewith. Test apparatus further comprises one or more memory locations 320 for storing various information associated with the processing of processor 310.

Figure 2:
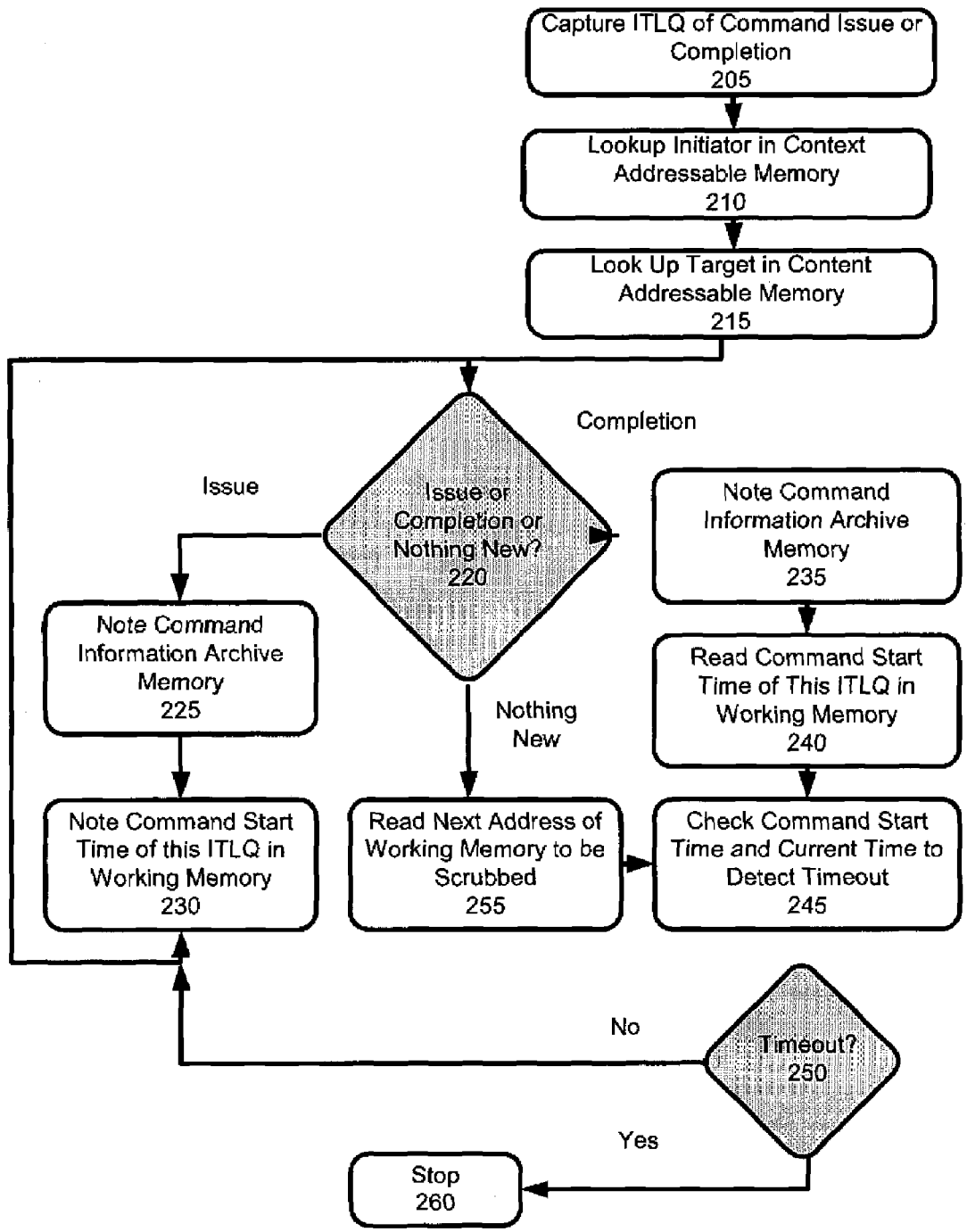
FIG. 2 is a flow chart diagram depicting processing in accordance with a preferred embodiment of the invention.

Referring next to FIG. 2, processing in accordance with the present invention will be described. At the start of a test session using the test system constructed in accordance with the invention, a table for storing commands, their start and end time, as described above, is initialized to indicate that no commands are currently indicated as being active during the test session. Once the test system is up and running, and a corresponding test session begins, one or more events may take place, the data corresponding thereto being transmitted over the various data lines of the array.

Thus, during such a test session, first a command is captured from the system being tested at step 205. At step 210, an initiator of the captured command is retrieved from a memory including an identification for each initiator. At step 215, a target for each captured command is retrieved from a memory including an identification for each target. The memory for storing the initiator and/or target identifications may be a content addressable memory, or any other appropriate memory type. Thus, after step 215, test apparatus 120 is aware of both the initiator and the target of the particular captured command.

At step 220, it is inquired whether the captured command is a newly issued command, a completed command, or nothing new. If the inquiry at step 220 indicates that the captured command is a newly issued command, then the new command information is placed into an archive memory for later reference, and at step 230 the command start time is stored in working memory associated with the particular captured command. Processing then returns to step 220, waiting for a new command to be captured and catalogued in steps 205, 210 and 215.

If the inquiry at step 220 indicates that the captured command is an indication of the completion of a prior issued request, then processing passes to step 235. The command information and completion time are entered into archive memory associated with the command and previously stored start time for the command. Processing then continues with step 240. The start time associated with this command completion indication is then retrieved from working memory (previously placed there at step 230), and at step 245, the start and end times are compared to determine whether there is a timeout, or otherwise the elapsed time between the two is too long or otherwise irregular. Inquiry at step 250 determines whether there is in fact a timeout or other irregularity. If so a timeout is registered and processing passes to step 260 where the test sequence is stopped. If all is well and there is no timeout or other irregularity, processing then returns to step 220, waiting for a new command to be captured and catalogued in steps 205, 210 and 215.

If the inquiry at step 220 indicates that the command indicates nothing new, processing passes to step 255. At step 255, a next address of working memory to be scrubbed is retrieved, which will be a previously issued command. The timing of that previously issued command and the current time are compared in step 245 as noted above to determine if there is a timeout or other abnormality. As noted above, if yes, processing stops at step 260, while if not processing returns to step 220.

A more in depth review of a number of the processing steps noted above will now be provided. If a new command is issued, then in step 225, as described above, the test system captures the information off the data transmission lines (connector lines) that uniquely identify this command (such as Initiator ID, Target ID, Logical Unit Number, and Queue Tag, for example) and maps this information to an address in the table in archive and working memory. This mapping is designed to be sure that no aliases are created. That is, if a particular command maps to a particular table address, no other possible command can map to that same table address. An archive ID is assigned to the command, and the mapped table entry is updated with a flag indicating that the corresponding command is active, a current timestamp, and the archive ID. Information known about the command at this time is recorded in the archive under the selected archive ID. If the underlying disk attachment standard forbids the re-use of command identifiers before the commands are completed (like SAS forbids the re-use of queue tags in the same Initiator/Target/Logical Unit Number, for example), the table entry can be checked before being updated to see if a command with that unique identity is already active.

If an existing command is completed, then as described above at step 235, the test system and method in accordance with the invention captures the command identity information off the various data connector lines and maps the information to the table entry corresponding to the command issuance, as described above. The timestamp in that prior table entry is checked against the current time (of the completed command) to see if the command took too long to complete. The Archive ID in the table entry is used to update the appropriate archive entry with the fact that the command has completed, and finally, the table entry is marked inactive.

Other processing may also be performed in a manner similar to those noted above, but not particularly pointed out in FIG. 2. For example, an existing command may be cancelled. This processing proceeds along much like the command completed case. The biggest difference is that any number of commands may be cancelled all at once. When this happens, the test system of the invention simply loops over all relevant table entries to determine the processing time and to determine timeouts and other abnormalities.

Furthermore, a periodic sweep may be performed. Thus, similar to processing noted above with respect to step 255, whenever an internal timer designates or other trigger is determined, the test system may read some or all of the entire table, searching for active commands that have been active for too long a time.

When a timeout (resulting from one or more of the above conditions), is noticed at step 250 (during a sweep or during the processing of a command completion or a command cancellation), the archive may be frozen, a visual or other indication may be given to the user, the test system software may be notified, and a signal may be sent out an external connector to trigger other devices as necessary so that the information may be appropriately conveyed. This basic idea above can be extended by triggering not only or exclusively on the first timeout detected, but on the Nth timeout detected, or a certain fixed time after the first timeout is detected.

In a preferred exemplary embodiment of the invention, such a test system may be implemented as a new FPGA design, and may be based upon a completely new or pre-existing platform. This preferred implementation of the invention may include one or more of the following features. The test system may support SATA (with and without Native Command Queuing) as well as the three protocols of SAS (Serial SCSI Protocol, Serial Management Protocol, and Serial Tunneling Protocol).

The unique command identifier may be composed of the Initiator ID, the Target ID, and the Queue Tag. (The Logical Unit Number (LUN) may be safely ignored, because it only exists in the SSP protocol, and there is a rule in SSP that states that tags may not be reused by an initiator in different LUNs of the same target.) To support Port Multipliers in SATA, the 4-bit PM Port number is concatenated with the larger target ID. The following table shows how these identifiers are derived in the various protocols:

TABLE 1

| Protocol | Initiator ID | PM Port | Target ID | Queue Tag |
|---|---|---|---|---|
| SATA (not queued) | Each channel has a unique hardwired value. | Captured from the Register H2D FIS. | Each channel has a unique hardwired value. | Hardwired to 32. |
| SATA (queued) | Each channel has a unique hardwired value. | Captured from the Register H2D FIS. | Each channel has a unique hardwired value. | Captured from the Register H2D FIS. |
| SSP | Captured from Open frame. | Hardwired to 0. | Captured from Open frame. | Captured from Command or Response frame. |
| SMP | Captured from Open frame. | Hardwired to 0. | Captured from Open frame. | Hardwired to 0. |
| STP (SATA not queued) | Captured from Open frame. | Captured from the Register H2D FIS. | Captured from Open frame. | Hardwired to 32. |
| STP (SATA queued) | Captured from Open frame. | Captured from the Register H2D FIS. | Captured from Open frame. | Captured from the Register H2D FIS. |

The above noted Queue Tag is not mapped, but is just used directly to form part of the table address. Thus, the address to the table is preferably formed according to the following sequence:

i. {3-bit-mapped Initiator ID, 8-bit mapped Target ID, 16-bit Queue Tag}

Eight bytes (64 bits) of information about each of the commands or other information to be stored in the table are stored in each table corresponding entry. This information preferably includes the following, but any other appropriate information may also be stored.

TABLE 2

| Size | Description |
|---|---|
| 1 bit | Command Active flag |
| 31 bits | Start timestamp |

TABLE 2-continued

| Size | Description |
|---|---|
| 3 bits | Task management function |
| 1 bit | (reserved) |
| 28 bits | Archive ID |

The system and method of the invention preferably may implement a table of 134,217,728 (128 Meg) entries. Therefore, an address into the table consists of 27 bits, and the information from the last table must be mapped without aliasing into a 27-bit address. To make this mapping possible, in a preferred embodiment of the test system and method of the invention a restriction that only 8 initiators and 256 targets are supported is imposed. Having more initiators and targets in the system will not crash the test session, but any commands from the extra initiators or to the extra targets will be ignored and not checked for timeouts. Of course, alternative embodiments of the invention may allow for any number of initiators and targets and may employ a larger table.

In SAS, the Initiator ID is a 64-bit number. In this preferred embodiment of the invention, in order to save space, the test system and method may ignore the most-significant 10 bits. This is considered to be safe, as the top bits of the ID is a company number (assigned sequentially by IEEE), and the assignments do not need these 10 bits yet. When necessary, this numbering scheme can be changed as appropriate. Supporting 8 initiators implies that the 54-bit Initiator ID be mapped into a 3-bit field of the table address. This mapping process is preferably performed with a Content-Addressable Memory (CAM), a very specialized kind of memory which is implemented with FPGA logic. This CAM consists of eight 54-bit storage locations, each with an associated "valid" bit and a comparator that checks to see if the data stored therein matches the incoming data.

The SAS 64-bit Target ID may be treated in much the same way. The only differences are that the Target CAM has 256 locations (mapping into an 8-bit value), and that the locations are 58 bits wide (so that they can hold the PM Port number, too).

In accordance with the invention, at the start of a test session, the CAM is empty and all the locations are marked invalid. When a mapping of data is to be performed, the Initiator ID is presented to the CAM, and one of three things happens. If no valid location matches (or there are no valid locations at all) and the CAM is not yet full, the first invalid location is loaded with the new data, that location is marked valid, and the address of that newly-valid location is used as the mapped value. If some location matches, the address of that matching location is used as the mapped value. If no location matches and the CAM is already full, it is determined that the initiator is a ninth (or more) initiator in the system, and the line event is ignored.

One feature of the SSP protocol is the concept of a "Task Management Function". Not all of these functions concern a test system for testing SAS, such as the present invention, but some of these functions cause command cancellation, and therefore must be tracked. When these functions are used, there is a 3-step sequence that is preferably implemented. First the command is issued by the initiator. Next, the management function is requested by the initiator. Finally, the management function is given a response by the target. In the cases that the preferred embodiment of the invention is concerned with, i.e. testing a SAS system, such a response may cancel out one or more commands.

Unfortunately, the response to the task management function does not necessarily indicate which task management function generated the response. However, the test system must know which function generated the response in order to know how many and which commands to cancel in the table that correspond to the function. Therefore, the preferred embodiment of the invention may further record in the table the management function that was active at the time the initiator requested a particular function. When the target responds, the test system and method of the invention looks in the table and is therefore able to determine what steps to take next.

While the invention has been described making reference to a system for testing a disk array, any testing that includes multiple initiators and targets may employ such architecture. Therefore, the invention is applicable to more general testing situations, and the scope of the invention should not be considered limited to the testing of disk arrays. Indeed, as noted above, the principles of the invention should also be considered applicable to any connectivity technology that supports simultaneous outstanding pending commands of any kind. The state machine described in accordance with the present invention may be used for data streaming, Ethernet transfers or any higher level protocols that use an underlying transport protocol to affect data transfer.

Therefore, in accordance with the invention an improved test system and method are provided that overcome problems encountered when developing testing devices for evolving technologies.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed:

1. A test system for testing a data transfer system, comprising:
    a memory for storing a first table, the first table noting at least a time of issuance of at least one command from each of a plurality of command initiators; and
    a processor for determining an issued command corresponding to a received completion of a command, the memory storing a time of completion of each of the issued commands from the plurality of command initiators, the processor comparing the time of issuance of each of the commands and the time of completion of each of the commands from the table in memory;
    wherein if the processor determines that a time longer than a predetermined time elapsed between the time of issuance of any of the commands associated with any of the plurality of command initiators and the time of completion of any of the commands, a timeout condition is registered.

2. The test system of claim 1, wherein upon registration of a timeout condition, the test system provides a history of the first table in the memory.

3. The test system of claim 1, wherein if a timeout condition is not registered, the time of issuance of the command and the time of completion of the command are removed from the table.

4. The test system of claim 1, further comprising a second memory for storing a second table, the second table storing a historical record of the first table.

5. The test system of claim 4, wherein upon registration of a timeout condition, the test system freezes the second table.

6. The test system of claim 5, wherein the frozen second table is provided as an output from the test system.

7. The test system of claim 1, wherein a command initiator issues each command and a target completes each command.

8. The test system of claim 7, wherein connectors position the test system between each of the plurality of command initiators and the targets.

9. The test system of claim 1, wherein there is a plurality of outstanding commands.

10. The test system of claim 1, wherein the data transfer system comprises at least in part a disk array.

11. A method for testing a data transfer system, comprising the steps of:
    storing a first table, the first table noting at least a time of issuance of a plurality of commands and a time of completion of each of the plurality of commands;
    receiving a notice of the completion of a command;
    determining a command from the first table corresponding to the received notice of the completion;
    comparing the time of issuance of each command and the time of completion of each command; and
    registering a timeout condition if a processor determines that a time longer than a predetermined time elapsed between the time of issuance and the time of completion of any command.

12. The method of claim 11, further comprising the step of providing a history of the first table in the memory upon registration of a timeout condition.

13. The method of claim 11, further comprising the step of removing the time of issuance of the command and the time of completion of the command if a timeout condition is not registered.

14. The method of claim 11, further comprising the step of storing a historical record of the first table in a second table.

15. The method of claim 14, further comprising the step freezing the second table upon registration of a timeout condition.

16. The method of claim 15, further comprising the step of outputting the frozen second table.

17. A computer program stored on a computer readable medium, the computer program comprising instructions for testing operation of an electronic system performing the steps of:
    storing a first table, the first table noting at least a time of issuance of a plurality of commands and a time of completion of each of the plurality of commands;
    receiving a notice of the completion of a command;
    determining a command from the first table corresponding to the received notice of the completion;
    comparing the time of issuance of each command and the time of completion of each command; and
    registering a timeout condition if a processor determines that a time longer than a predetermined time elapsed between the time of issuance and the time of completion of any command.

* * * * *